Aug. 2, 1927.

H. A. TRAVERS 1,637,360

CIRCUIT INTERRUPTING SYSTEM

Filed July 9, 1921

WITNESSES:

INVENTOR
Henry A. Travers
BY
ATTORNEY

Patented Aug. 2, 1927.

1,637,360

UNITED STATES PATENT OFFICE.

HENRY A. TRAVERS, OF FOREST HILLS BOROUGH, PENNSYLVANIA, ASSIGNOR TO WESTINGHOUSE ELECTRIC & MANUFACTURING COMPANY, A CORPORATION OF PENNSYLVANIA.

CIRCUIT-INTERRUPTING SYSTEM.

Application filed July 9, 1921. Serial No. 483,417.

My invention relates to circuit interrupting systems and particularly to remotely controlled systems.

The object of my invention is to provide an arrangement for preventing an electrically-operated circuit interrupter from being held closed when a short-circuit or heavy overload obtains on the circuit controlled by the interrupter.

Electrically-operated circuit interrupters are usually closed by an electromagnetic machanism, such, for example, as a motor or an electromagnet, the moving member of which is operatively connected to the movable member of the circuit interrupter. The circuit interrupter is usually latched in its closed position and, to open the same, the latch must be released or tripped by means of a trip coil. A remotely-disposed control switch, that is ordinarily manually operated, is used to connect the coils of the closing or tripping mechanism to a suitable source of electromotive force. If the control switch is actuated to cause the circuit interrupter to close while an overload or short-circuit obtains on the circuit, overload relays, that are provided for the protection of the circuit under such conditions, may complete a circuit to the trip coil and cause it to release the latch. However, since the coil of the closing mechanism is still energized, through the control switch, the circuit interrupter is held closed through the closing mechanism.

In systems heretofore employed, the circuit by which the control switch controlled the closing mechanism of the interrupter was opened if the control switch was actuated to effect the closing of the interrupter while the short circuit obtained on the circuit. The opening of the controlling circuit was effected by means of a switch which had to be reset and, therefore, required an additional operation.

Other systems embodying the same feature avoided the necessity of an auxiliary resetting device by employing a control switch to reset the switch that opened the control circuit of the closing mechanism.

In order to avoid the necessity for the additional resetting operation, I provide a relay switch that automatically opens a circuit, which includes a coil or coils of the closing mechanism, after each closing operation of the circuit interrupter. The switch is retained in a biased position after the closing of the interrupter to maintain the circuit of the closing coils open so long as the control switch is retained in its "close" position. The interrupter is thus prevented from being held closed upon a short circuit or heavy overload, if abnormal conditions obtain while the control switch is actuated to close the circuit interrupter.

The relay switch is so disposed that the circuit of the coil for energizing the closing mechanism cannot be re-established until the relay switch has been reset or the control switch moved to its normal position, since, otherwise, the circuit of the closing coil would be re-established and the circuit interrupter would close and open again, and would continue this so-called "pumping" action so long as the control switch should be maintained in its "closed" position. This continual closing and opening of the circuit interrupter on a heavy overload or short circuit might damage considerably the apparatus connected to the circuit and subject the circuit interrupter mechanism to heavy and unnecessary stresses and the contacts to the danger of fusing.

Upon the release of the control switch, the restraining means for the relay switch is de-energized and the relay switch is permitted to reset itself for a subsequent closing operation of the interrupter.

Figure 1:
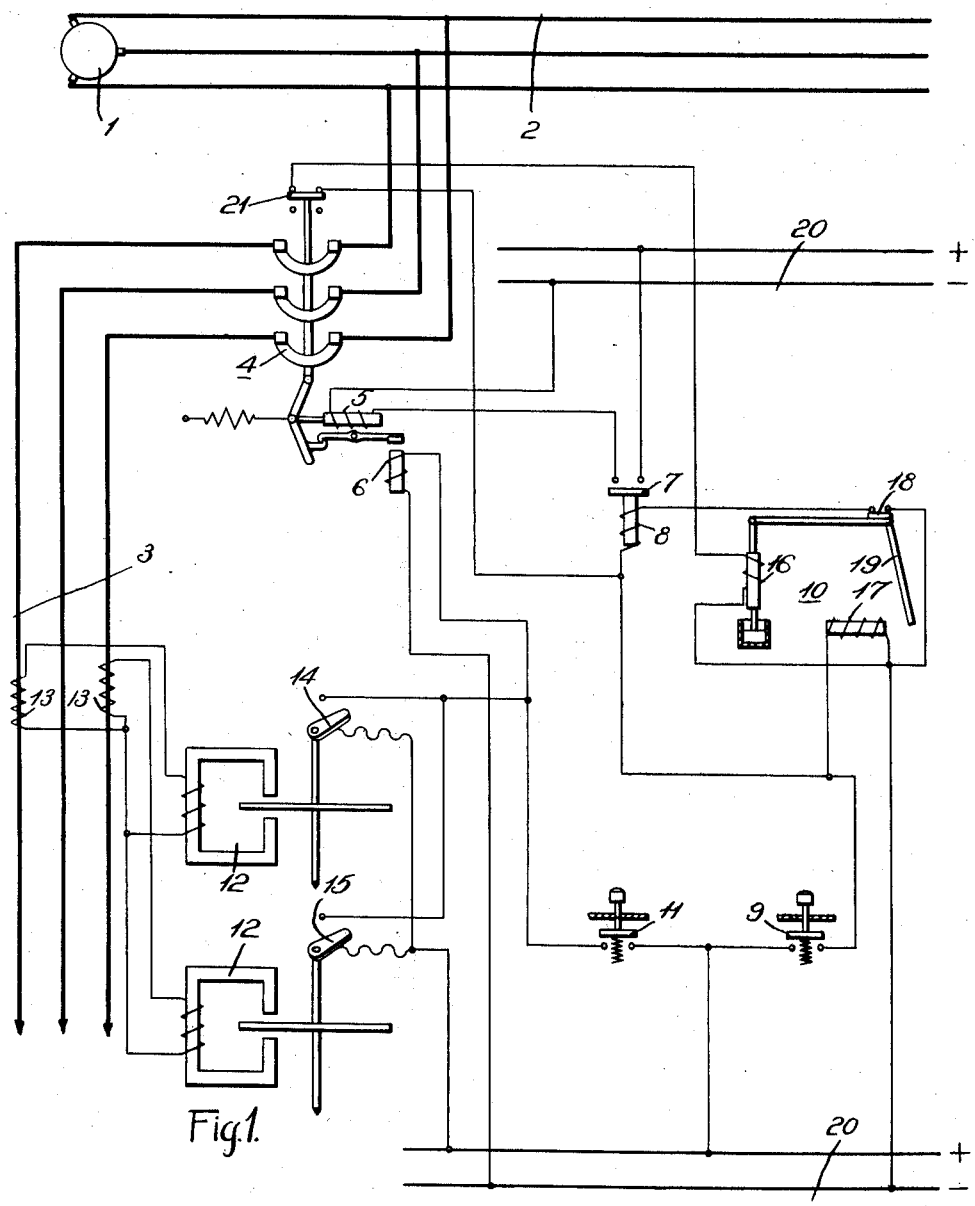
Figure 1 is a diagrammatic view of a circuit-interrupting system embodying my invention.
Figure 2:
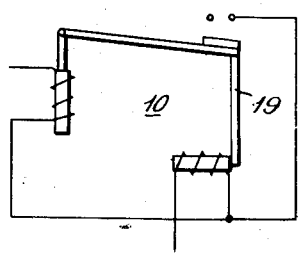
Fig. 2 is a diagrammatic view of the relay switch shown in Fig. 1, illustrating the position thereof while maintaining the circuit of the closing coils open.

A source 1 of electromotive force supplies energy to a supply circuit 2 from which energy is supplied to a feeder circuit 3 through a circuit interrupter 4.

The circuit interrupter 4 is provided with a closing coil 5 to a trip coil 6. The circuit of the closing coil 5 is controlled by a switch 7 that is actuated by a relay winding 8.

The energization of the relay winding 8 is controlled by a control switch 9 and by a relay 10 that is actuated immediately after each closing of the interrupter 4 to open the circuit of the relay winding 8 and thereby to effect the de-energization of the closing coil 5.

The circuit of the trip coil 6 is controlled by a control switch 11 and a plurality of relays 12 that are energized from current transformers 13 to effect the engagement of switch 14 when a short circuit or heavy overload obtains on the circuit 3.

The relay 10 comprises an operating winding 16 and a restraining winding 17 of a switch 18 that is controlled by the two windings. When the winding 16 becomes energized, the switch 18, which normally is closed, is opened and a magnetizable member 19 becomes so disposed with respect to the magnetic circuit of the winding 17 as to be retained in a biased position so long as the winding 17 remains energized. The strength of the magnetic circuit 17 is not sufficient to actuate the magnetizable member 19, but is merely sufficient to retain it in its biased position, after the actuation thereof, to maintain the switch 18 open.

Assuming the interrupter 4 to be open, the switch 9 is depressed to close the same, thereby completing a circuit from the positive conductor of a control circuit 20 through the relay winding 8 and the switch 18 to the negative conductor of the control circuit 20. The switch 7 is thereupon closed to connect the closing coil 5 between the positive and negative conductors of the control circuit 2. The interrupter 4 is thereupon closed and latched in position.

Immediately upon the closing of the interrupter 4, an auxiliary switch 21, that is actuated thereby, completes a circuit from the positive conductor of the control circuit 20 through the switch 9, which is still in its closed position, and the actuating winding 16 of the relay 10 to the negative conductor of the control circuit 20, thereby energizing the winding 16. The relay 10 is thereupon actuated to open the switch 18 and the circuit of the closing coil 5 is consequently opened.

Assuming that the control switch 9 is still retained in its operative position, at which it effects the closing of the interrupter 4, an auxiliary circuit will also be completed thereby that maintains the winding 17 energized. Since the winding 17 is energized when the relay 10 is actuated after the closing of the interrupter 4, the magnetizable member 19 is held in its biased position to maintain the switch 18 open.

Thus, if the control switch 9 is held in its operative position for an interval that is longer than the time required for the interrupter 4 to be closed, the circuit of the closing coil 5 will be opened immediately after the closing of the interrupter and then will be maintained open by the relay 10 so long as the control switch 9 is retained in its operative position.

When the control switch 9 is released, the relay 10 resets itself to close the switch 18 but the circuit of the closing coil 5 is not reclosed, since the circuit of the relay winding 8 is open at the control switch 9.

If a fault should obtain on the circuit 3 when the control switch 9 is depressed to effect the closing of the interrupter 4, the consequent closing of the switch 14 or 15 will effect the energization of the trip coil 6 to permit the interrupter to open, but, if the control switch 9 is held in its depressed position, the actual opening of the interrupter will be controlled by the relay 10. If the control switch 9 is held in its depressed position, the interrupter 4 will not reclose on the overload and cannot be reclosed until the switch 9 is released and again depressed.

With the arrangement disclosed above, no additional resetting devices or controlling circuits for such resetting devices are required. The circuit of the closing coil is opened immediately after the closing of the interrupter, if the control switch is held in its operative position for an interval longer than required for the breaker to close. The circuit of the closing coil 5 is maintained open by the relay 10 so long as the switch 9 is held in its operative position.

My invention is not limited to the various elements that are illustrated or to the arrangement thereof, since modifications may be made therein within the spirit and scope of the invention, as set forth in the appended claims.

I claim as my invention:—

1. In a circuit-interrupter-controlling system, the combination with an interrupter embodying a closing coil, of means for completing an energizing circuit for the closing coil and two switches for controlling said means, one of said switches being actuated to its open position by an electrically operated relay device after each closing of the interrupter and maintained in its open position by holding means embodied in said relay device as long as the other of said switches is maintained in its closed position.

2. In a circuit-interrupter-controlling system, the combination with an interrupter embodying a closing coil, of means for completing an energizing circuit for the closing coil and two switches for controlling said means, one of said switches being actuated to its open position by an electrically operated retarded relay device after each closing of the interrupter and maintained in its open position by holding-means embodied in said relay device as long as the other of said switches is maintained in its closed position.

3. In a circuit-interrupter-controlling system, the combination with an interrupter embodying a closing coil, of means for completing an energizing circuit for the closing coil and two switches for controlling said means, one of said switches being actuated to its open position by an electrically operated relay device a predetermined interval of time after each closing of the interrupter and maintained in its open position by holding means embodied in said relay device as long as the other of said switches is maintained in its closed position.

4. In a circuit-interrupter-controlling system, the combination with an interrupter embodying a closing coil, of means for completing an energizing circuit for the closing coil and two switches for controlling said means, one of said switches being controlled by a two-coil electrical relay device in which one coil actuates said switch to its open position after each closing of the interrupter and the other coil maintains said switch in its open position as long as the other of said switches is maintained in its closed position.

5. In a circuit-interrupter-controlling system, the combination with an interrupter embodying a closing coil, of means for completing an energizing circuit for the closing coil and two switches for controlling said means, one of said switches being controlled by a retarded two-coil electrical relay device in which one coil actuates said switch to its open position a predetermined interval of time after each closing of the interrupter and the other coil maintains said switch in its open position as long as, and only as long as, the other of said switches is maintained in its closed position.

In testimony whereof, I have hereunto subscribed my name this sixth day of July, 1921.

HENRY A. TRAVERS.